US007308076B2

(12) United States Patent
Studer et al.

(10) Patent No.: US 7,308,076 B2
(45) Date of Patent: Dec. 11, 2007

(54) X-RAY SYSTEM COMPRISING AN X-RAY SOURCE, A DETECTOR ASSEMBLY, AND A SHUTTER

(75) Inventors: Wolfgang Studer, Geisenheim (DE); Erwin Kirsten, Ingelheim (DE)

(73) Assignee: Smiths Heimann GmbH, Wiesbaden (DE)

( * ) Notice: Subject to any disclaimer, the term of this patent is extended or adjusted under 35 U.S.C. 154(b) by 0 days.

(21) Appl. No.: 10/476,986

(22) PCT Filed: Apr. 17, 2002

(86) PCT No.: PCT/EP02/04225

§ 371 (c)(1),
(2), (4) Date: Nov. 7, 2003

(87) PCT Pub. No.: WO02/091022

PCT Pub. Date: Nov. 14, 2002

(65) Prior Publication Data
US 2004/0134986 A1    Jul. 15, 2004

(30) Foreign Application Priority Data
May 8, 2001    (DE) ............................... 101 22 279

(51) Int. Cl.
*G01N 23/04*    (2006.01)
(52) U.S. Cl. .................... 378/57; 378/114; 378/160
(58) Field of Classification Search ............... 378/57, 378/162, 210, 114, 160, 117; 235/384, 462.13
See application file for complete search history.

(56) References Cited

U.S. PATENT DOCUMENTS

| 3,766,383 | A | * | 10/1973 | Harris et al. ................... 378/51 |
| 4,644,143 | A | * | 2/1987 | McJohnson et al. ... 235/462.42 |
| 5,606,586 | A | * | 2/1997 | Amemiya et al. ............ 378/34 |
| 5,719,704 | A | * | 2/1998 | Shiraishi et al. ............... 355/53 |
| 6,031,890 | A | | 2/2000 | Bermbach et al. |
| 6,225,654 | B1 | | 5/2001 | Evans, Jr. et al. |
| 6,359,962 | B1 | * | 3/2002 | Yagi ............................ 378/44 |
| 6,400,795 | B2 | | 6/2002 | Yagi |
| 6,507,025 | B1 | * | 1/2003 | Verbinski et al. ............. 378/57 |
| 6,552,346 | B2 | | 4/2003 | Verbinski et al. |
| 6,649,906 | B2 | | 11/2003 | Adolph et al. |
| 7,039,159 | B2 | | 5/2006 | Muenchau et al. |

FOREIGN PATENT DOCUMENTS

| DE | 195 32 965 A1 | 3/1997 |
| DE | 198 56 107 A | 6/2000 |
| DE | 199 40 403 A1 | 3/2001 |
| WO | WO 00 33060 | 6/2000 |

* cited by examiner

*Primary Examiner*—Edward J. Glick
*Assistant Examiner*—Chih-Cheng Glen Kao
(74) *Attorney, Agent, or Firm*—Geissler, Olds, Lowe, and Richardson

(57) ABSTRACT

A method and system include at least one X-ray source for producing at least one X-ray beam, at least one detector assembly, at least one shutter, and a barcode reader. The shutter directs the at least one X-ray beam toward the detector assembly. The barcode reader is affixed, in a predetermined proximity, to the shutter for detecting a barcode on an object that is moved along the shutter thereby causing the shutter to be opened from a closed state and/or fully closed once the barcode has been detected.

16 Claims, 4 Drawing Sheets

X-RAY SYSTEM COMPRISING AN X-RAY SOURCE, A DETECTOR ASSEMBLY, AND A SHUTTER

This application is the national phase under 35 U.S.C. § 371 of PCT International Application No. PCT/EP02/04225, which has an International filing date of Apr. 17, 2002, and designated the United States of America, the entire contents of which are incorporated herein by reference.

BACKGROUND OF THE INVENTION

1. Field of the Invention

The present invention relates to an X-ray system for large, voluminous objects.

2. Description of the Background Art

DE 195 32 965 C2 discloses an X-ray examining system for large objects. This system is moved as a self-propelled device over the object.

Also known are stationary X-ray examining systems, wherein the large test object (inspection item) travels through the system. Frequently the test object is comprised of trucks and delivery vans (VAN), which travel through the silhouette system under their own power. The X-rays are activated and deactivated by, preferably, a three-stage light barrier system.

However, this system has the disadvantage that the activation of the X-rays is, and must be, set for a known maximum-length cab (driver's cab) so that activation of the X-rays is delayed for shorter cabs, resulting in incomplete detection of the load.

This or other non-contact systems are often used for identification and simple position finding of objects.

Thus, a method and a device for non-contact position finding and/or identification of an object is also known, which is described in DE 199 40 403 A1. Here, in addition to a transponder system, an optical sensor is also used which additionally scans the object. Hence the object is identified and/or its position is determined from a combination of the optical data acquired by the optical sensor and the transponder data. These optical data may be affixed to the object in the form of a barcode.

DE 198 56 107 A1 discloses an apparatus for labeling luggage that consists of non-contact read and write data carriers located on the luggage to ensure reliable identification.

SUMMARY OF THE INVENTION

It is therefore an object of the present invention to provide an X-ray system especially for large objects that operates as a function of the object and thus provides precise detection.

The invention is based on the concept of activating and deactivating the X-rays from an X-ray source using a simple barcode that is affixed to an object to be inspected, wherein the object is moved past the X-ray source at a defined distance therefrom.

It is well known that the X-rays from such X-ray sources are activated by a shutter. Consequently, it is advantageous for a barcode reader to be located in a predetermined proximity to the shutter to define the activation and deactivation of the X-rays.

In a simple embodiment, the barcode is used to activate the X-rays at a precise point, thus providing precise detection, while deactivation can be accomplished with light barriers in a known manner.

In another embodiment, an additional barcode can be used for deactivating the X-rays as well.

In a further embodiment of the invention, the barcode is composed of object-dependent data.

These object-dependent data may be taken from the vehicle registration papers, among other sources, and defined vehicle length in addition to vehicle type so that deactivation of the X-rays can be achieved using a special data processing logic with knowledge of the vehicle length. The object-dependent data are also useful in image management, etc.

Preferably, these objects are large voluminous objects, which may be, for example, trucks, delivery vans, cargo containers, etc. In this context the X-ray system itself may be mobile or stationary in design.

One advantage of using a barcode to control the X-rays resides in the fact that the examination is independent of the cab length, type of truck, and so on. In addition, targeted transillumination of sections of an object may be undertaken by the barcode, for instance, when only this specific section is of interest.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
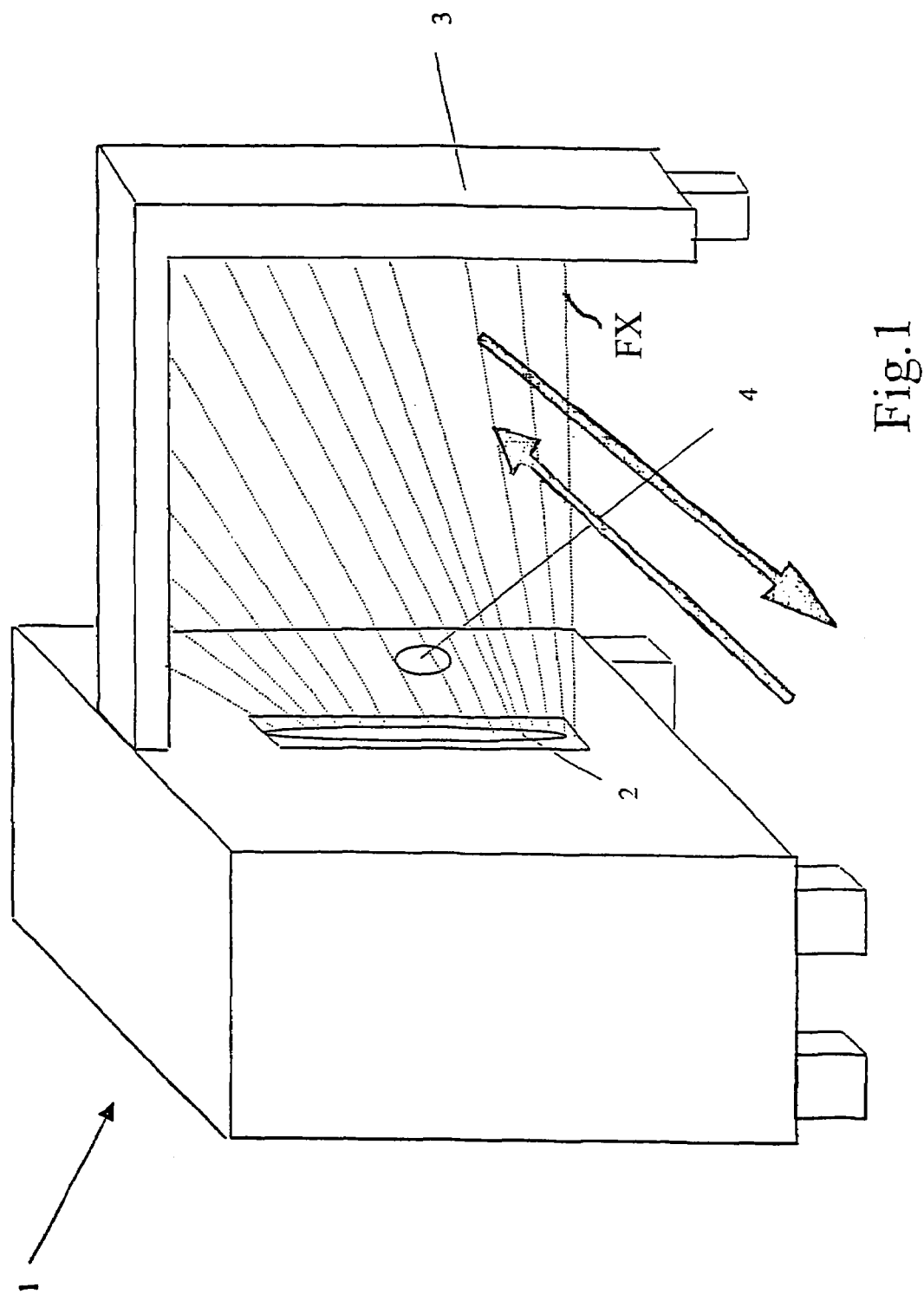
FIG. 1 is an X-ray system in a reduced view.

FIG. 1 shows, in a somewhat stylized form, an X-ray system 1 for inspection of large objects 5,6, such as motor vehicles, cargo containers, etc., wherein only the parts important for the invention have been drawn.

Located in the X-ray system 1 is preferably an X-ray source (not shown), from which at least one X-ray beam FX is emitted and collimated through a shutter 2 on the X-ray system 1 for the duration of the transillumination of the object. The beam FX impinges on a detector assembly 3, which here takes the form of a linear detector. A barcode reader 4 is installed in or on the X-ray system 1 preferably in the immediate vicinity of the shutter 2.

Figure 2:
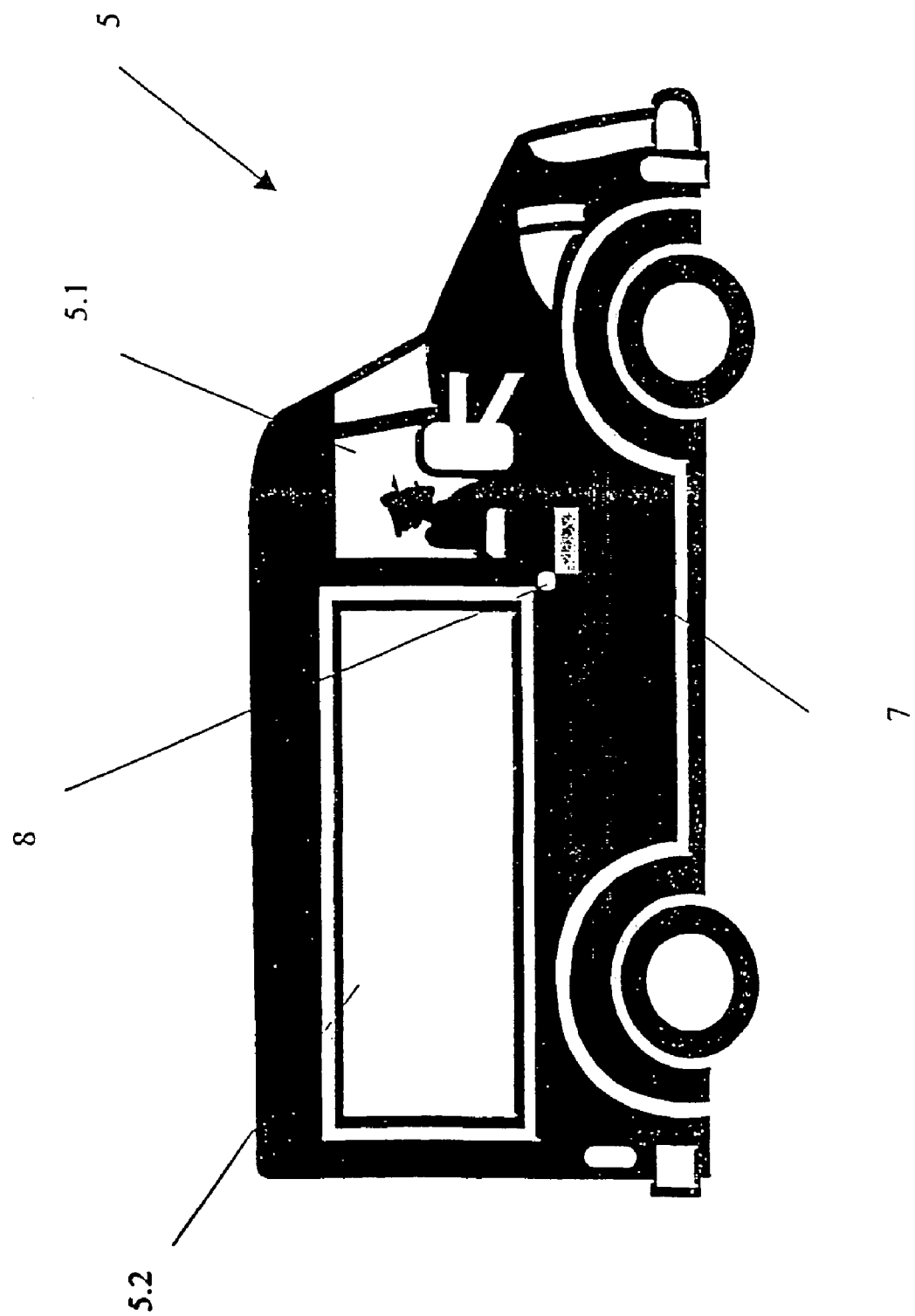
FIG. 2 is a small vehicle without a separate driver's cab.
Figure 3:
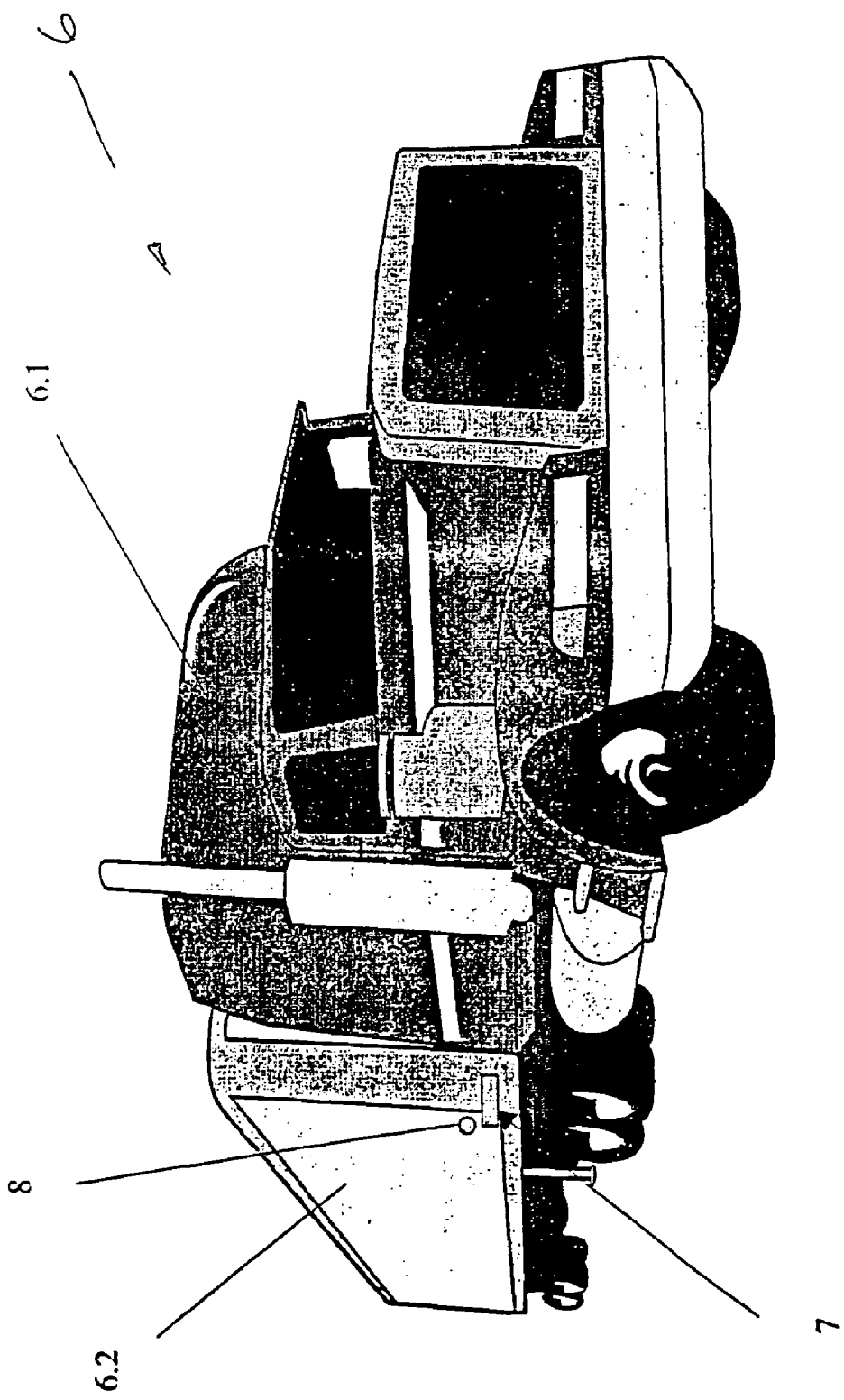
FIG. 3 is a larger vehicle with a separate driver's cab.
Figure 4:
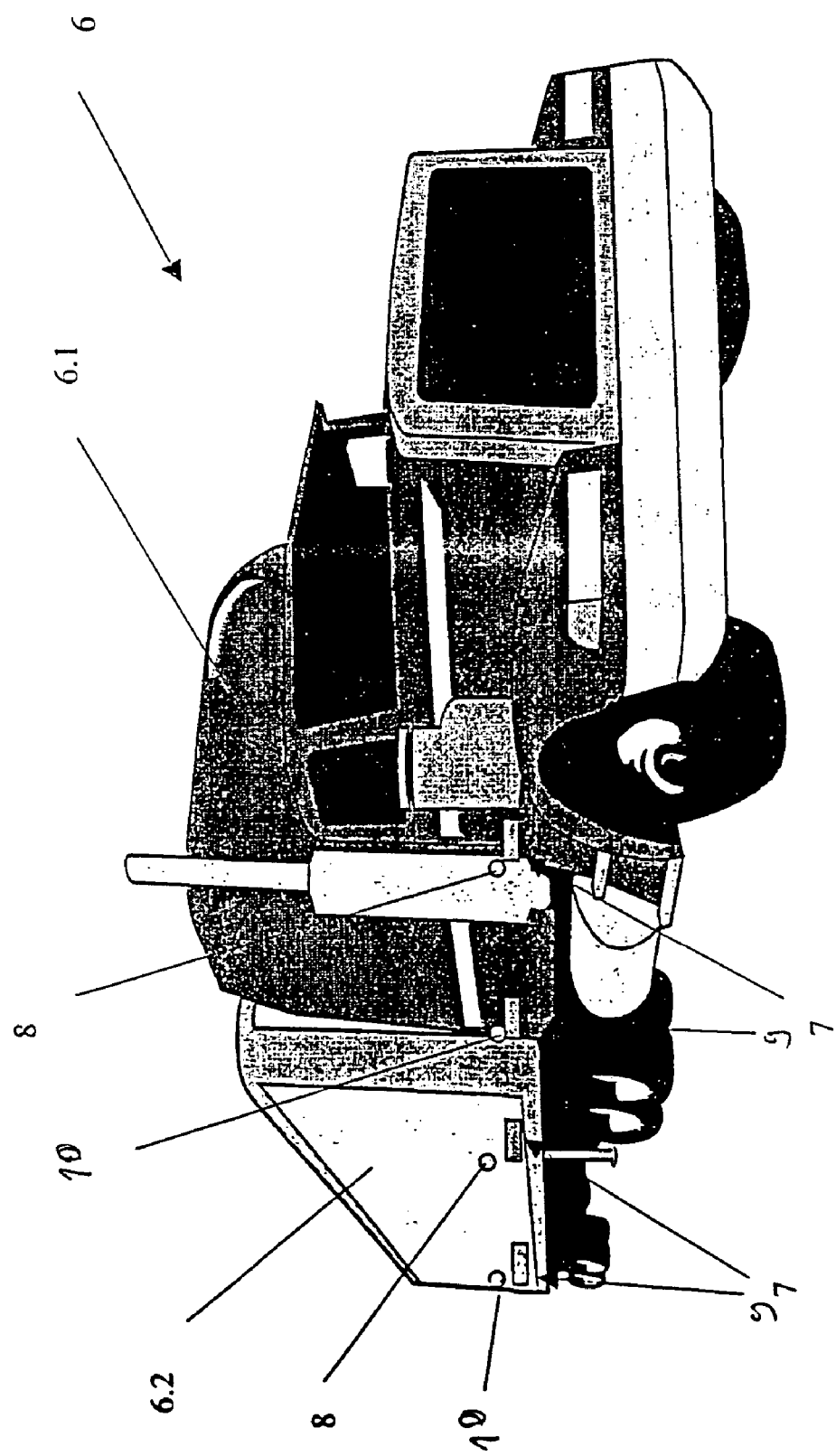
FIG. 4 is another variant of FIG. 3.

FIG. 2 and FIG. 3 depict two different objects 5, 6 to be transilluminated, wherein the cab 5.1 of the object 5 in FIG. 2 is not separate from the cargo area 5.2, while the object 6 in FIGS. 3 and 4 has, in addition to a cargo area 6.2, a driver's cab 6.1 that is separate from the cargo area 6.2.

In accordance with the concept of the invention, a barcode 7 is affixed to the objects 5, 6. If the object 5 passes the barcode reader 4, which can detect the object at a distance of, for example, 1.5 meters, the reader identifies the objects 5 by the barcode 7, which is affixed in front of an inspection start 8 of the cargo area 5.2 that the X-ray beam FX should be activated by opening the shutter 2.

As can be seen in FIG. 3, the barcode 7 on the object 6—in contrast to the object 5—is not located on the vehicle cab, but is located on the cargo area 6.2, and it, too, defines activation of the X-ray beam FX at inspection start 8.

In both cases, deactivation of the X-ray beam can take place in a known manner by means of a light barrier system (not shown here).

FIG. 4 shows a further development of FIG. 3. Here, the barcode 7 defines an inspection start 8 and a barcode 9 defines an inspection end 10. In the process, a part of the vehicle cab 6.1 where the driver is not located may be inspected as well.

Additional large objects that may be inspected using this X-ray system 1 also include cargo containers and similar objects, wherein the X-ray system 1 shown as stationary in FIG. 1 may also be designed as a self-propelled X-ray system.

The proposed solution makes it possible to transilluminate at a precise point even objects 5, 6 with different shapes and dimensions, resulting, for example, from the vehicle cabs 5.1, 6.1 of different length and cargo areas 5.2, 6.2 of different length, whereby the barcode 7 is affixed as desired to the object 5, 6. The barcode 7 can be affixed to the object 5, 6 by a magnetic disk or an adhesive. The distance between the barcode reader 4 and the shutter 2 determines the location where the barcode 7 is affixed to the object 5,6, which is to say the distance of the barcode 7 to be affixed to the object 5, 6 from the inspection start 8 or from the inspection end 9 of the object 5, 6.

An X-ray system for voluminous objects, such as X-ray systems in the form of mobile devices that are displaced over the object, or in the form of fixed X-ray systems through which a voluminous object to be inspected (inspection product) is passed. Heavy goods vehicles or delivery vans (VAN) frequently include objects to be inspected and pass through the silhouette system under their own propulsion. The X-rays are activated and deactivated by a preferably three-phase photoelectric barrier system. The x-ray system may activate or deactivate the X-rays of an X-ray source using a simple barcode that is attached to an object to be inspected, the object being driven past the X-ray source at a defined distance from the latter. The X-rays of X-ray sources of this type are generally activated by a shutter. It is thus advantageous if a barcode reader is located in a predetermined proximity to the shutter to define the activation or deactivation of the X-rays.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An X-ray system comprising:
   at least one X-ray source for producing at least one X-ray beam;
   at least one detector assembly;
   at least one shutter that directs the at least one X-ray beam toward a sample object location and the detector assembly, wherein the sample object location is between the X-ray source and the detector assembly; and
   a barcode reader being affixed, in a predetermined proximity, to the shutter, the barcode reader being configured to detect a barcode on an object that is moved along the shutter and configured to cause the shutter to be opened from a closed state and/or fully closed once the barcode has been detected.

2. The X-ray system according to claim 1, wherein the opening or closing of the shutter is triggered by a defined inspection start or a defined inspection end of the object being moved past the shutter.

3. The X-ray system according to claim 2, wherein the barcode contains information on an inspection start at a precise point or an inspection end at a precise point or both.

4. The X-ray system according to claim 1, wherein the barcode contains additional information about the object as object-dependent data.

5. The X-ray system according to claim 4, wherein the additional information comprises data relating to one or more dimensions of the sample object, the barcode reader being configured to process the additional information to control a start time and a stop time for producing the at least one X-ray beam based on the additional information.

6. The X-ray system according to claim 4, wherein the additional information is used at opening or closing of the shutter for activating and/or deactivating the at least one X-ray beam.

7. The X-ray system according to claim 1, wherein the object is moved past the X-ray system at a distance of up to 1.50 m from the barcode reader.

8. The X-ray system according to claim 1, wherein a distance between the barcode reader and the shutter determines a distance between the barcode to be applied to the object and an inspection start or an inspection end of the object.

9. The X-ray system according to claim 1, wherein the barcode is affixed to the object by a magnetic disk or an adhesive.

10. The X-ray system according to claim 1, wherein the object is at least one of a truck, van, or mobile vehicle connected to a cargo container.

11. The X-ray system according to claim 10, wherein the object to be inspected in a cargo container.

12. An X-ray system comprising:
   at least one X-ray source for producing at least one X-ray beam;
   at least one detector assembly;
   at least one shutter, for allowing or preventing the at least one X-ray beam to pass towards the detector assembly; and
   a barcode reader being affixed, in a predetermined proximity, to the shutter, the barcode reader being configured to detect a barcode on an object that is moved along the shutter and and configured to control opening and closing of the shutter based on the detected barcode on the object,
   wherein the object is one of a plurality of motor vehicles having different length driver's cabs and cargo areas to which the barcode is applied as desired.

13. An X-ray system comprising:
   an x-ray source for producing an x-ray beam;
   a detector for detecting the x-ray beam transmitted through a sample object location, wherein the sample object location is between the x-ray source and the detector;
   a shutter for enabling the x-ray beam to pass therethrough, the shutter being positioned between the x-ray source and the detector; and
   a barcode reader configured to detect a barcode affixed to an object at the sample object location, the barcode reader configured to provide an output to the shutter based on the read barcode, the output determining an open state from a closed state or determining a closed state of the shutter.

14. The X-ray system according to claim 13, wherein the object is one of a plurality of motor vehicles having different length driver's cabs and cargo areas to which the barcode is applied as desired.

15. A method for scanning an object with an X-ray beam, the method comprising the steps of:
    detecting a barcode affixed to the object by a barcode reader;
    outputting a signal from the barcode reader to a shutter;
    controlling opening and closing of the shutter based on the output signal, and
    determining, based on the output signal, an open state from a closed state or determining a closed state of the shutter,
    wherein in the open state of the shutter, the X-ray beam, which is produced by an X-ray source, is able to be detected by a detector, and
    wherein in the closed state of the shutter, the X-ray beam is not detected by the detector.

16. The method according to claim 15, wherein the object is one of a plurality of motor vehicles having different length driver's cabs and cargo areas to which the barcode is applied as desired.

\* \* \* \* \*